United States Patent
Sackett

(10) Patent No.: US 10,548,365 B2
(45) Date of Patent: Feb. 4, 2020

(54) ENHANCED POINTE SHOE FOR BALLET AND POINTE SHOE CONVERSION KIT

(71) Applicant: Emily Jane Sackett, San Diego, CA (US)

(72) Inventor: Emily Jane Sackett, San Diego, CA (US)

(73) Assignee: Emily Jane Sackett, San Diego, CA (US)

( * ) Notice: Subject to any disclaimer, the term of this patent is extended or adjusted under 35 U.S.C. 154(b) by 57 days.

(21) Appl. No.: 15/842,817

(22) Filed: Dec. 14, 2017

(65) Prior Publication Data
US 2018/0160762 A1    Jun. 14, 2018

Related U.S. Application Data

(60) Provisional application No. 62/433,843, filed on Dec. 14, 2016.

(51) Int. Cl.
| | |
|---|---|
| A43B 5/12 | (2006.01) |
| A43B 3/00 | (2006.01) |
| A43B 23/02 | (2006.01) |
| A43B 13/04 | (2006.01) |
| F21V 23/04 | (2006.01) |
| F21V 23/00 | (2015.01) |
| F21S 4/24 | (2016.01) |
| F21S 9/02 | (2006.01) |
| H05B 37/02 | (2006.01) |
| F21Y 103/10 | (2016.01) |
| F21Y 115/10 | (2016.01) |

(52) U.S. Cl.
CPC ............ *A43B 3/001* (2013.01); *A43B 3/0005* (2013.01); *A43B 5/12* (2013.01); *A43B 13/04* (2013.01); *A43B 23/021* (2013.01); *A43B 23/0215* (2013.01); *A43B 23/0245* (2013.01); *F21S 4/24* (2016.01); *F21S 9/02* (2013.01); *F21V 23/001* (2013.01); *F21V 23/04* (2013.01); *F21V 23/0485* (2013.01); *H05B 37/0272* (2013.01); *F21Y 2103/10* (2016.08); *F21Y 2115/10* (2016.08)

(58) Field of Classification Search
CPC ......... A43B 3/001; A43B 3/0005; A43B 3/16; A43B 3/24; A43B 5/12
USPC .......................................... 36/8.3, 137, 136
See application file for complete search history.

(56) References Cited

U.S. PATENT DOCUMENTS

| | | | |
|---|---|---|---|
| 3,070,907 A * | 1/1963 | Rocco ................. | A43B 1/0036 36/1 |
| 5,329,432 A | 7/1994 | Bland | |

(Continued)

*Primary Examiner* — Marie D Bays
(74) *Attorney, Agent, or Firm* — Perkins Coie LLP

(57) ABSTRACT

Disclosed are devices, kits and methods for an enhanced pointe shoe for ballet. In some embodiments, an enhanced pointe shoe includes light-emitting diodes (LEDs) and sensors that may activate the LEDs based on the ballet performers movements. For example, the sensor may be a pressure sensor that activates the LEDs when a ballet dancer stands en pointe. In other embodiments, a kit that includes a power source, LEDs, one or more sensors, a toggle switch and connecting wires may be used to enhance a pointe shoe. In yet other embodiments, a ballet pointe shoe cover, which for example, may be made from spandex, and that includes the power source, LEDs and sensors may be used to enhance a pointe shoe for ballet performances.

17 Claims, 6 Drawing Sheets

(56) References Cited

U.S. PATENT DOCUMENTS

| | | | |
|---|---|---|---|
| 5,732,486 A | 3/1998 | Rapisarda | |
| 5,821,858 A | 10/1998 | Stone | |
| 5,903,103 A | 5/1999 | Garner | |
| 5,909,088 A | 6/1999 | Wut | |
| 6,065,851 A | 5/2000 | So | |
| 6,104,140 A | 8/2000 | Wut | |
| 6,354,712 B1 | 3/2002 | Anteby | |
| 6,619,812 B2 | 9/2003 | Rapisarda | |
| 7,170,019 B2 | 1/2007 | Wong | |
| 7,695,154 B2 | 4/2010 | Ellenburg | |
| 7,794,101 B2 | 9/2010 | Galica | |
| 8,464,442 B1 | 6/2013 | Alford, II | |
| 8,752,310 B1 | 6/2014 | Smith, III | |
| 9,015,965 B2 | 4/2015 | Smith, III | |
| 9,265,299 B2 | 2/2016 | Smith, III | |
| 2004/0233658 A1* | 11/2004 | Hsu | A43B 3/0005 362/84 |
| 2006/0032085 A1* | 2/2006 | Randall | A43B 3/0005 36/8.3 |
| 2006/0104047 A1* | 5/2006 | Guzman | A43B 1/0036 362/103 |
| 2007/0011919 A1* | 1/2007 | Case, Jr. | A43B 1/0036 36/132 |
| 2007/0144040 A1* | 6/2007 | Chen | A43B 3/0005 36/137 |
| 2007/0201221 A1* | 8/2007 | Cherdak | A43B 3/0005 362/103 |
| 2014/0157632 A1* | 6/2014 | Kim | A43B 3/001 36/137 |
| 2014/0196318 A1* | 7/2014 | Verheem | A43B 1/0081 36/100 |
| 2015/0003047 A1* | 1/2015 | Lin | F21V 31/005 362/103 |
| 2015/0029005 A1* | 1/2015 | Kim | A43B 3/001 340/12.5 |
| 2016/0061426 A1* | 3/2016 | Gou | A43B 3/001 362/103 |
| 2016/0091186 A1* | 3/2016 | Chow | A43B 3/001 362/103 |

* cited by examiner

ENHANCED POINTE SHOE FOR BALLET AND POINTE SHOE CONVERSION KIT

CROSS-REFERENCES TO RELATED APPLICATIONS

This application claims the benefit of U.S. Provisional Application No. 62/433,843, filed 14 Dec. 2016, which is hereby expressly incorporated herein by reference in its entirety for all purposes.

TECHNICAL FIELD

This patent document relates to ballet pointe shoes and kits to enhance pointe shoes for ballet and dance performances.

BACKGROUND

Ballet is a highly technical dance performance that is enjoyed and appreciated the world over. Pointe shoes are a type of shoe worn by ballet performers. They are an integral part of classical ballet, and make the performers appear weightless and enable them to dance en pointe for extended periods of time.

SUMMARY

Disclosed are devices, kits and methods for an enhanced pointe shoe for ballet. In order to accentuate intricate ballet movements, such as kicks and twirls, pirouettes and arabesques, the disclosure provides attaching light-emitting diodes (LEDs) and sensors to a pointe shoe. In an example, the sensors include a pressure sensor and an accelerometer that are able to trigger the LEDs, and which may be activated when a performer stands en pointe.

In one aspect, the disclosure may be used to provide an enhanced pointe shoe for ballet. The enhanced pointe shoe used by a performer for ballet performances may include a plurality of light-emitting diodes (LEDs) affixed to an external surface of the pointe shoe; a power source; a pressure sensor configured to activate when the performer stands en pointe, wherein the pressure sensor is in a box of the pointe shoe or affixed to a platform of the pointe shoe; a toggle switch configured to switch between the plurality of LEDs remaining off and the plurality of LEDs being activated as a function of the pressure sensor; and at least one wire connecting the power source to the plurality of LEDs, the toggle switch, and the pressure sensor.

In another aspect, the disclosure may be used to provide a kit to enhance a pointe shoe used by a performer for ballet performances, and may include a plurality of light-emitting diodes (LEDs); a power source; a pressure sensor; a toggle switch; and at least one wire, wherein the plurality of LEDs is configured to be affixed to an external surface of the pointe shoe, wherein the pressure sensor is configured to activate when the performer stands en pointe, wherein the pressure sensor is in a box of the pointe shoe or affixed to a platform of the pointe shoe, wherein the toggle switch is configured to switch between the plurality of LEDs remaining off and the plurality of LEDs being activated as a function of the pressure sensor, and wherein the at least one wire is configured to connect the power source to the plurality of LEDs, the toggle switch, and the pressure sensor.

In yet another aspect, the disclosure may be used to provide another kit to enhance a pointe shoe used by a performer for ballet performances, and may include a pointe shoe cover that includes a body, a toe portion and a sole; a plurality of light-emitting diodes (LEDs); a power source; a pressure sensor; a toggle switch; and at least one wire, wherein the body of the pointe shoe cover is configured to envelop the pointe shoe, wherein the toe portion is configured to align with a platform of the pointe shoe, wherein the plurality of LEDs is affixed to an external surface of the pointe shoe cover, wherein the pressure sensor is configured to activate when the performer stands en pointe, wherein the toggle switch is configured to switch between the plurality of LEDs remaining off and the plurality of LEDs being activated as a function of the pressure sensor, and wherein the at least one wire is affixed to an internal surface of the pointe shoe cover and is configured to connect the power source to the plurality of LEDs, the toggle switch, and the pressure sensor.

The subject matter described in this patent document can be implemented in specific ways that provide one or more of the following features.

Figure 1:
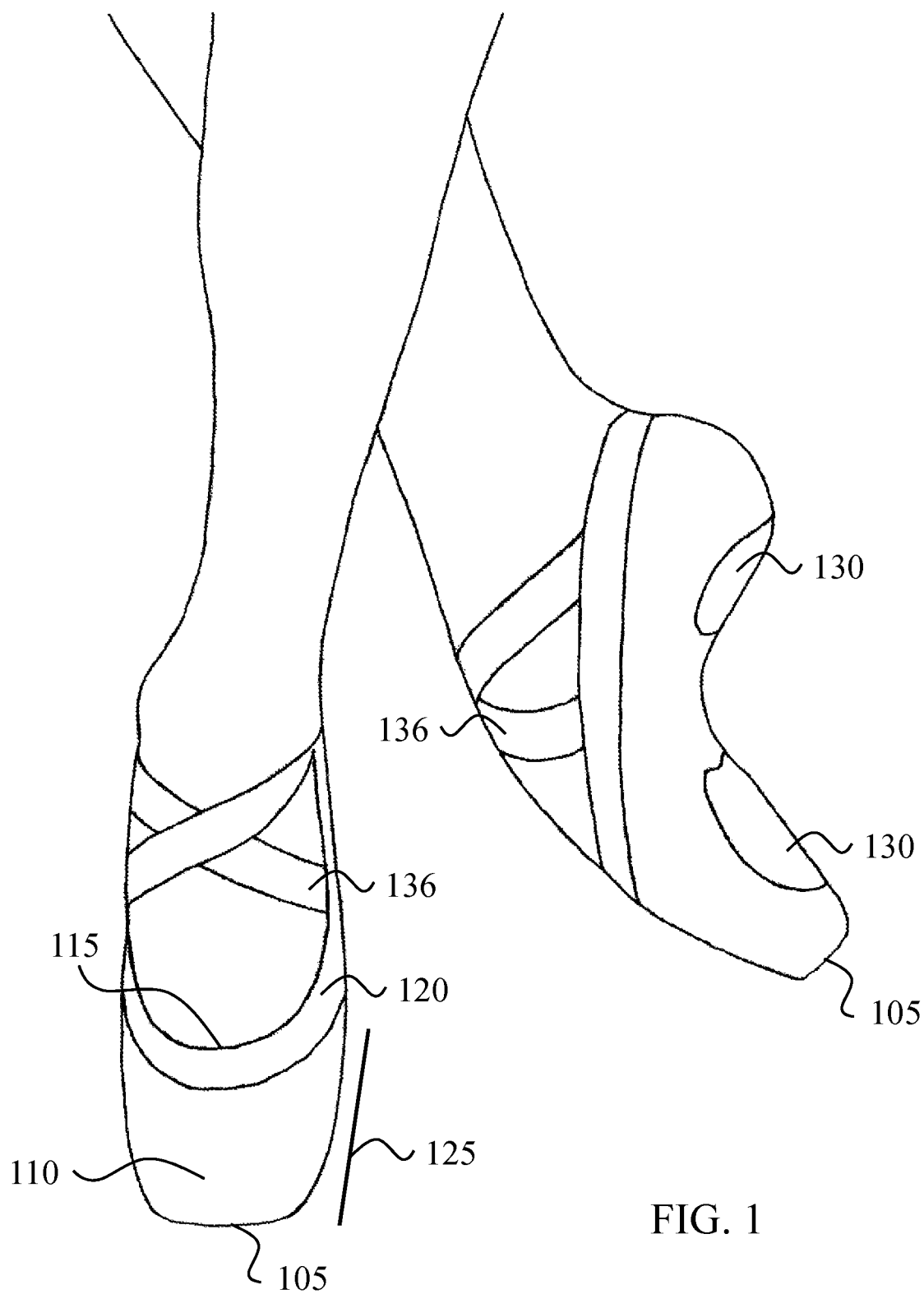
FIG. 1 shows the different parts of a pointe shoe for ballet performances.

Like labels are used to refer to the same or similar features in the drawings.

DETAILED DESCRIPTION

Disclosed are devices, kits and methods that may be used for embodiments of an enhanced pointe shoe for ballet. Pointe shoes with LEDs, which may be activated based on a performer's movements, may enhance ballet performances, both classical and modern. Certain aspects of the disclosed embodiments are shown in one or more of the figures. As such, every aspect of the embodiment in a particular figure may not be explicitly described in the context of that figure. Components may be described and claimed as connected or operatively connected, both of which are interpreted to mean that the components may be either directly or indirectly connected, but able to perform the function specified and/or described.

FIG. 1 shows the different parts of a pointe shoe for ballet performances. Pointe shoes share two important structural features that enable dancers to dance on the tips of their toes: (i) a box within the front end of the shoe that encases and supports the dancer's toes, and (ii) a shank, which is a piece of rigid material that serves to stiffen the sole so as to provide support for the arch of the en pointe foot.

In some embodiments, the external surface of a pointe shoe is covered with fabric, thus concealing the box and other internal structural elements and lending an aesthetically pleasing look to the shoe. For example, pointe shoes may be covered with satin or canvas. Pointe shoes may be available in light pink colors, and less commonly in black and white.

As shown in FIG. 1, the vamp (110) refers to the length of the box (125) and material from the toe platform (105) to the opening of the shoe, which is known as the throat (115). In some embodiments, the vamp is v-shaped. In other embodiments, it may be round. The lip of the opening of the shoe is referred to as the binding (120), and in some embodiments, a drawstring may run through the binding. The box (125) is a rigid enclosure within the front end of the shoe that encases and supports the dancer's toes. The front end of the box (125) is flattened so as to form a platform (105) upon which the dancer can balance, and fabric covers the exterior of the box for aesthetics.

In some embodiments, the sole (130) of the pointe shoe may be constructed from a piece of leather that is attached to the shoe with adhesive and reinforced by stitching along its edges. The sole overlaps and secures the unfinished edges of the shoe's exterior fabric. Pointe shoes may be manufactured with either scraped soles, which provide superior traction, or buffed soles, which have a smoother surface for reduced traction.

Aesthetic appearance is of paramount importance for modern pointe shoes. In some embodiments, and to achieve an elegant appearance, the shoe's more decorative outer fabric may be prominently featured, covering the maximum possible area of the shoe's visible surfaces. In an example, the sole (130) may be made of thin material to give it a minimal profile, and a margin of satin is pleated around it so that the sole covers only part of the bottom of the shoe.

A pointe shoe may employ one or more elastic bands (136) to secure it to the foot. The elastic band—which traverses the front of the ankle and the top of the arch of the foot—keeps the heel of the shoe in place against the foot when the dancer is en pointe.

Figure 2:
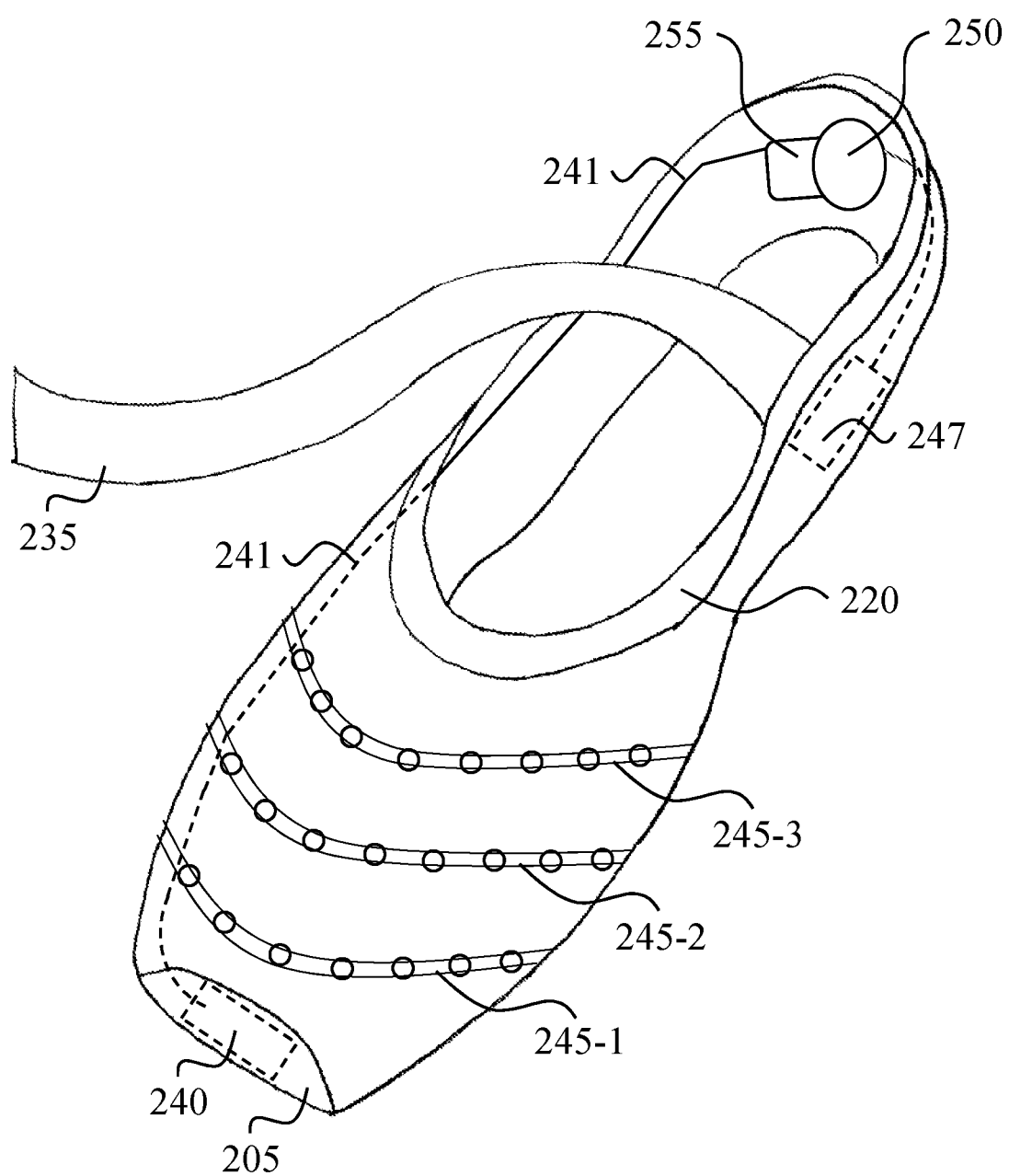
FIG. 2 shows a diagram of an example of an enhanced pointe shoe.

FIG. 2 shows a diagram of an example of an enhanced pointe shoe. This example includes some features and/or components that are similar to those shown in FIG. 1, and described above. At least some of these features and/or components may not be separately described in this section.

As shown in FIG. 2, LED ribbons (245-1, 245-2 and 245-3) are attached to the vamp of the pointe shoe. A wire (241) is attached to the internal surface of the pointe shoe, and connects the pressure sensor (240) and the LED ribbons to the power source (250) and the control circuitry (255). In some embodiments, the control circuitry includes a toggle switch that switches between the LEDs remaining off and LEDs being activated as a function of the pressure sensor.

In some embodiments, the pressure sensor (240) may be implemented as a switch membrane, which is an electrical switch that can turn the LEDs on and off, and may be a circuit printed on flexible polyethylene terephthalate (PET, a common thermoplastic polymer resin). In other embodiments, the pressure sensor may be implemented as a capacitive sensor layer or using other tactile sensing modalities that are well known in the art. In some embodiments, and as shown in FIG. 2, the switch membrane (240) may be located inside the box of the pointe shoe and adjacent to the platform (205). In other embodiments, the switch membrane may be attached to the platform (205) on the external surface of the shoe, and covered with satin so as not to impede the performer's movements.

In some embodiments, and as shown in FIG. 2, the power source (250) is a button cell that is attached at the heel to an internal surface of the pointe shoe. In other embodiments, the power source may be a coin cell, a cylindrical battery or a rectangular battery. The power source may be attached to an external surface of the pointe shoe. For example, a battery pack may be attached below the binding (220) and toward the back of the pointe shoe. The form factor and placement of the battery is such that it in no way impedes or restricts the dancer's movements in the enhanced pointe shoes.

The pointe shoe shown in FIG. 2 may include one or more fabric ribbons (235), which when the shoe is worn, secure the pointe shoe to the performer's foot. In an example, the fabric ribbons may be wrapped in opposite directions, overlapping one another so as to form a cross at the front. The ends are then tied together in a knot, which is then tucked under the ribbon on the inside of the ankle to hide it from view. In some embodiments, the ribbons may be attached to the binding (220) of the shoe, and may be included in addition to elastic straps. In other embodiments, only ribbons or elastic straps may be employed. In yet other embodiments, LEDs may be attached to one or both of the ribbons.

In some embodiments, the pointe shoe may further include a radio frequency (RF) transceiver (247), capable of low-rate and low-latency wireless communication using a wireless protocol, that is connected to the pressure sensor and the power source. As discussed in the example above, the switch membrane in the box of the pointe shoe (or attached internally or externally to the platform of the pointe shoe) is activated when the performer goes en pointe. In some embodiments, the activation of the switch membrane triggers the RF transceiver, which signals the RF transceiver in the other pointe shoe, which may not be en pointe. However, the pointe shoe that is aloft may also activate its LEDs based on the received wireless signal. The position of the RF transceiver is not restricted to the embodiment shown in FIG. 2. It may be attached to either the external or internal surface of the pointe shoe, but should not impede the performer's movements in any way.

In some embodiments, the control circuitry (255) may implement a specific sequence of individual LED activations in the LED ribbons (245-1, 245-2, 245-3). In other embodiments, the RF transceiver may transmit wireless signals that instruct the control circuitry to implement the same or different sequence of individual LED activations in the other pointe shoe.

In an example, the wireless protocol that may be used includes but is not limited to IEEE 1394, Firewire, Universal Serial Bus (USB) 1.0 or higher, RS-232, Ethernet, Ultrawide Band (UWB), Zigbee, 60 GHz, Wi-fi, 802.11x (where x equals a, b, g, n, etc.), PSTN, Bluetooth, Bluetooth Low Energy (BLE), Radio Frequency (RF), Infrared (IR), cellular telephone, IEEE 802.15.1, CDMA, TDMA, FDMA, wireless, or any other proprietary or non-proprietary communication protocol.

Figure 3:
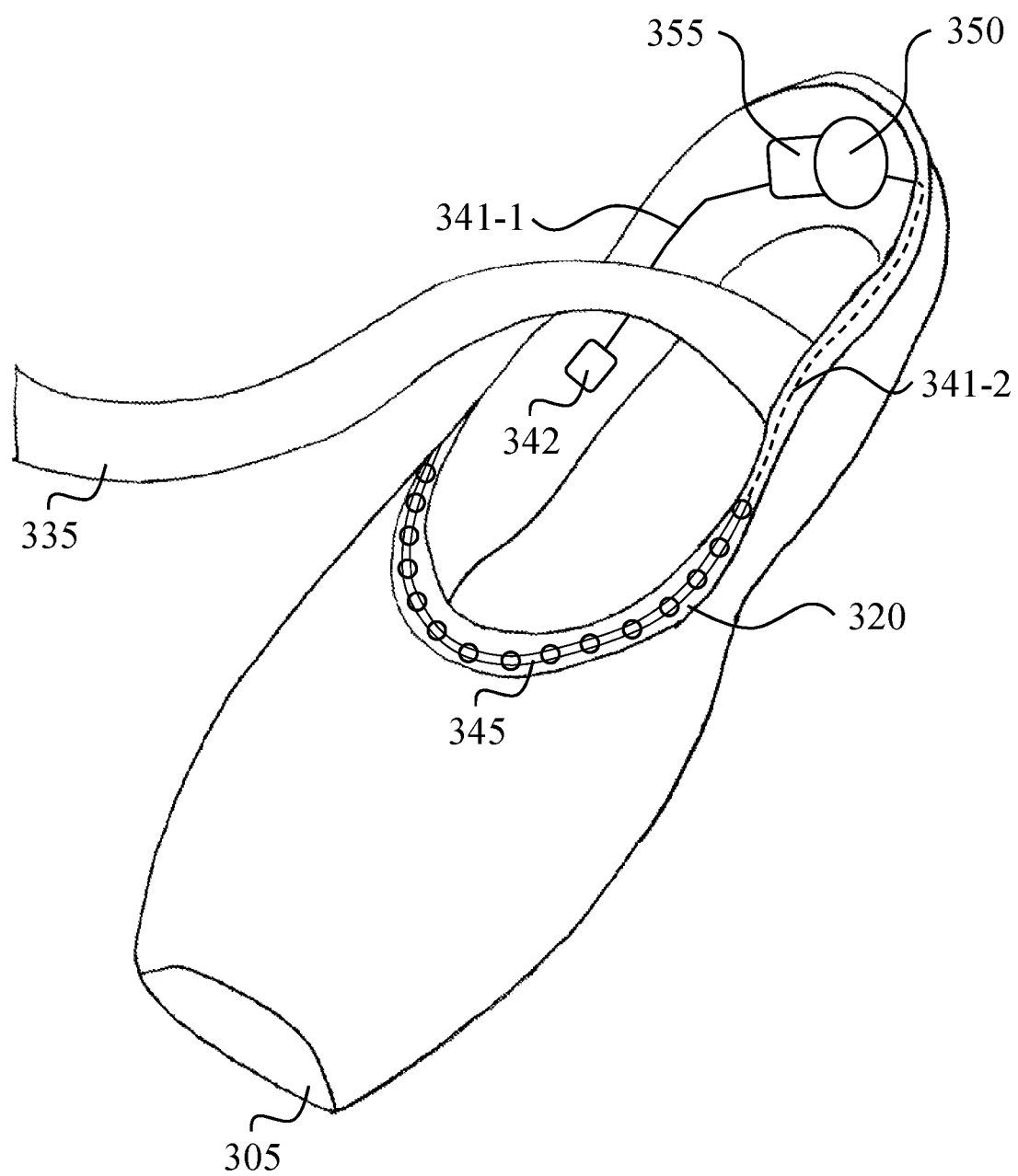
FIG. 3 shows a diagram of another example of an enhanced pointe shoe.

FIG. 3 shows a diagram of another example of an enhanced pointe shoe. This example includes some features and/or components that are similar to those shown in FIGS. 1 and 2, and described above. At least some of these features and/or components may not be separately described in this section.

As shown in FIG. 3, an LED ribbon (345) may be attached to the front portion of the binding (320) of the pointe shoe. In other embodiments, the LED ribbon may be placed along the entire length of the binding, forming a continuous oval around the opening where the performer's foot fits into the pointe shoe. There may be a space between the LED lights on the LED ribbon as shown in FIG. 3. In other embodiments, there may be no space between the individual LED lights, thereby forming a solid, continuous strand of LED lights sewn into the binding. Different combinations and configurations of LED strands may be made according to style and preference, as long as they do not impede the dancer's ability to dance freely.

In some embodiments, the LED lights may emit light with wavelengths that span the range from 460 nm (nanometers) to 700 nm. For example, a blue color is displayed using light with a wavelength between 460 nm and 490 nm, whereas a red color uses light with a wavelength between 620 nm and 645 nm. In other embodiments, blacklight LEDs that emit ultraviolet with wavelengths between 310 nm and 450 nm may be used.

In some embodiments, the LED ribbons LEDs may be replaced (or augmented) by (with) other LED displays. For example, embodiments of the present invention are compatible with any LED display including, by way of example, organic LED (OLED), active matrix OLED (AMOLED), flexible OLED (FOLED), phosphorescent OLED (PhOLED), polymer LED (PLED), passive matrix OLED (PMOLED), polymer OLED (POLED), resonant color OLED (RCOLED), small molecule OLED (SmOLED), stacked OLED (SOLED), transparent OLED (TOLED), neon organic iodine diode (NOID), or the like. In an example, a flexible OLED display may cover a portion of the vamp or the entire surface of the pointe shoe, and be connected to the switch membrane and power source using at least one wire.

FIG. 3 shows the power source (350) and control circuitry (355) connected to an accelerometer (342) using a wire (341-1) and to the LED ribbon on the front portion of the vamp using another wire (341-2). In this example, the speed of a performer's movement may be used to activate the LEDs. Different activation thresholds, which activate the LEDs at different speeds, may be set based on creative and artistic choices. For example, the time elapsed since a certain point in the performance may trigger different sequences of LEDs. In another example, the number of times the performer goes en pointe may be used to determine LED activation.

Figure 4:
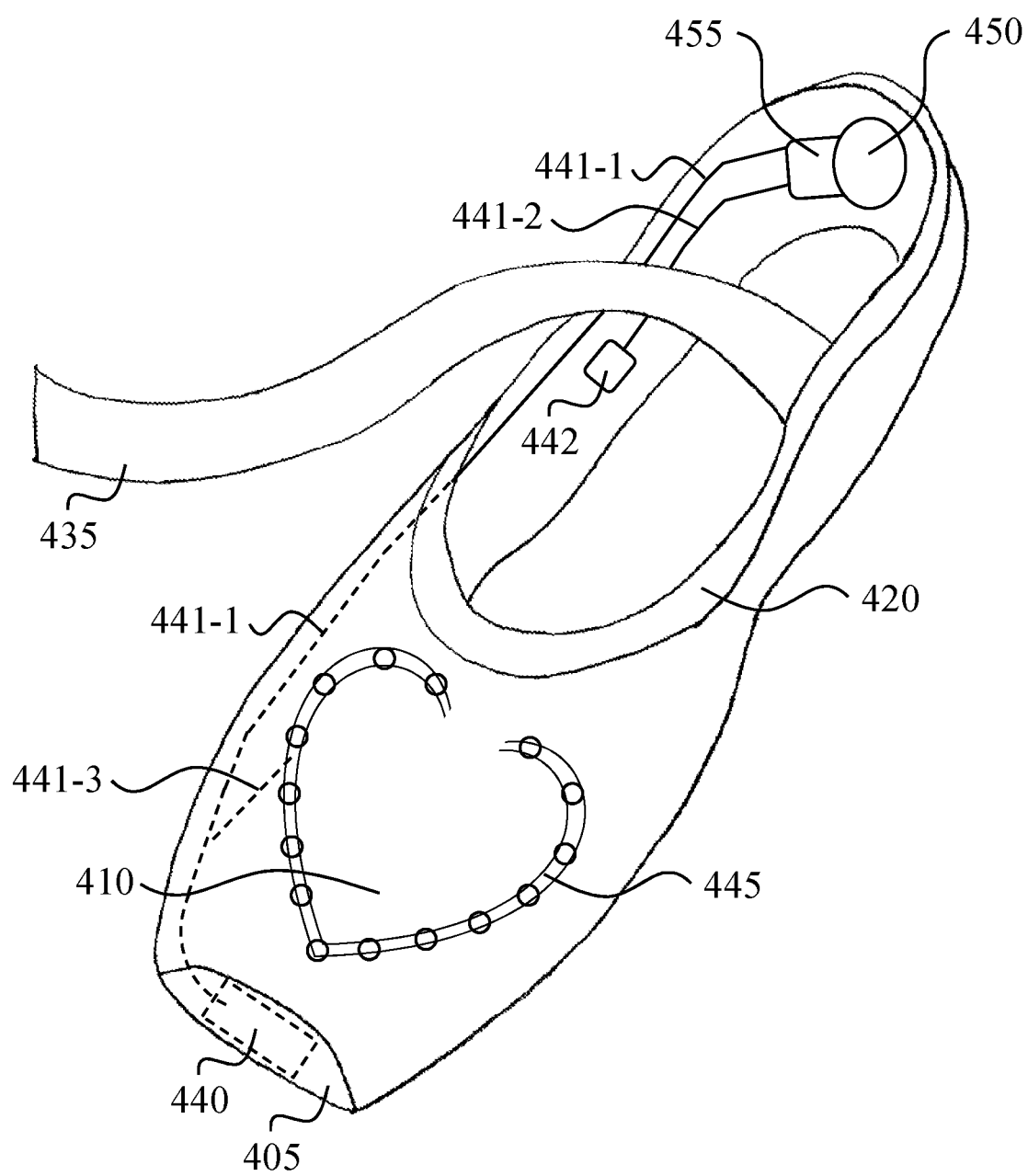
FIG. 4 shows a diagram of yet another example of an enhanced pointe shoe.

FIG. 4 shows a diagram of yet another example of an enhanced pointe shoe. This example includes some features and/or components that are similar to those shown in FIGS. 1, 2 and 3, and described above. At least some of these features and/or components may not be separately described in this section.

In some embodiments, LEDs may be attached to the pointe shoe in different styles and shapes. For example, as shown in FIG. 4, an LED ribbon (445) is attached to the external surface of the shoe in the shape of a heart. Herein, the LEDs are activated based on either or both of an accelerometer (442) and a switch membrane (440). The control circuitry (455) may include a toggle switch that switches between the LEDs remaining off and LEDs being activated as a function of the switch membrane or the accelerometer.

In other embodiments, the toggle switch may be configured to switch between the LEDs remaining off, the LEDs being activated by the accelerometer (442), and the LEDs being activated by the switch membrane (440). In yet other embodiments, the toggle switch may be configured to switch between the LEDs remaining off, the LEDs always remaining on, and the LEDs being activated by either one or both of the accelerometer and the switch membrane.

Figure 5:
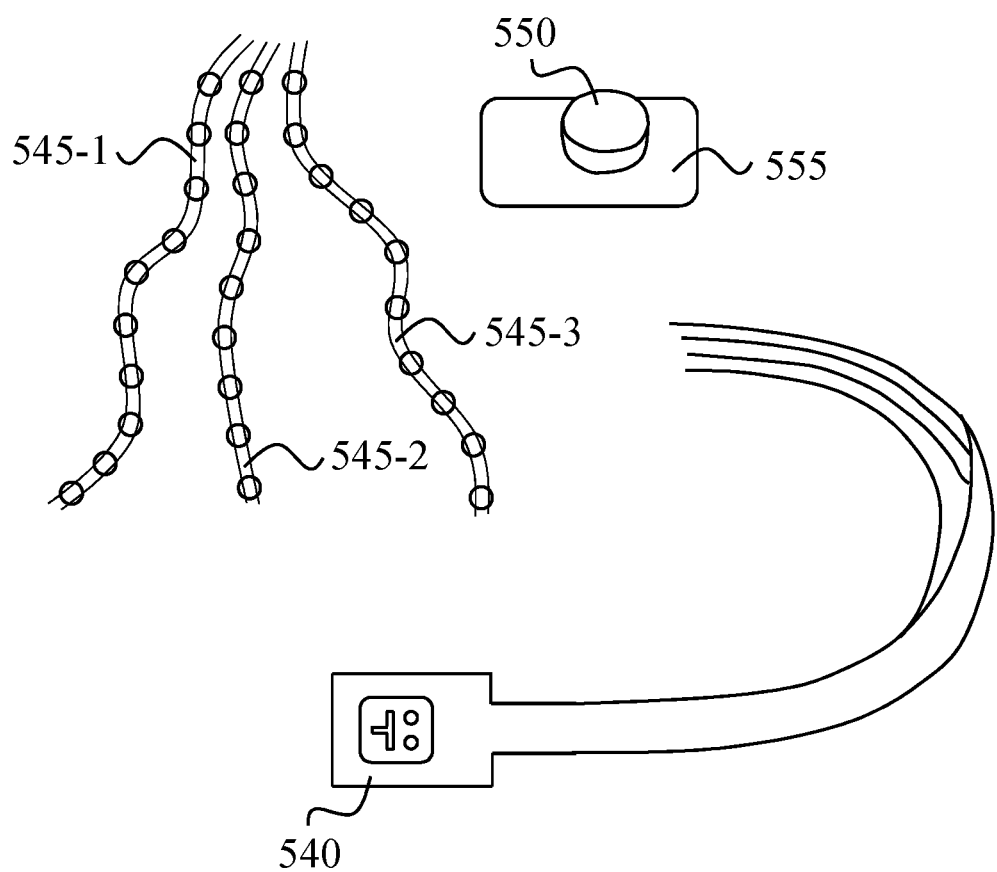
FIG. 5 shows a diagram of an example of a kit for enhancing a pointe shoe.

In the examples in FIGS. 2-4, described above, an enhanced pointe shoe features LEDs, a power source, and sensors that include accelerometers and switch membranes. In contrast, FIG. 5 shows a diagram of an example of a kit that may be used to enhance a pointe shoe in a "do it yourself" approach. In some embodiments, the kit may include LED ribbons (545-1, 545-2, 545-3), a button cell power source (550) connected to control circuitry (555), and a switch membrane (540) that may be connected to the power source and control circuitry.

These components may be attached to the pointe shoe using basic sewing equipment. In an example, a needle and thread may be included in the kit to facilitate the attachment of the kit components to the external and internal surfaces of the pointe shoe. In other embodiments, the kit may include, for example, an accelerometer, different configurations and styles of LEDs, and different types of power sources.

Figure 6:
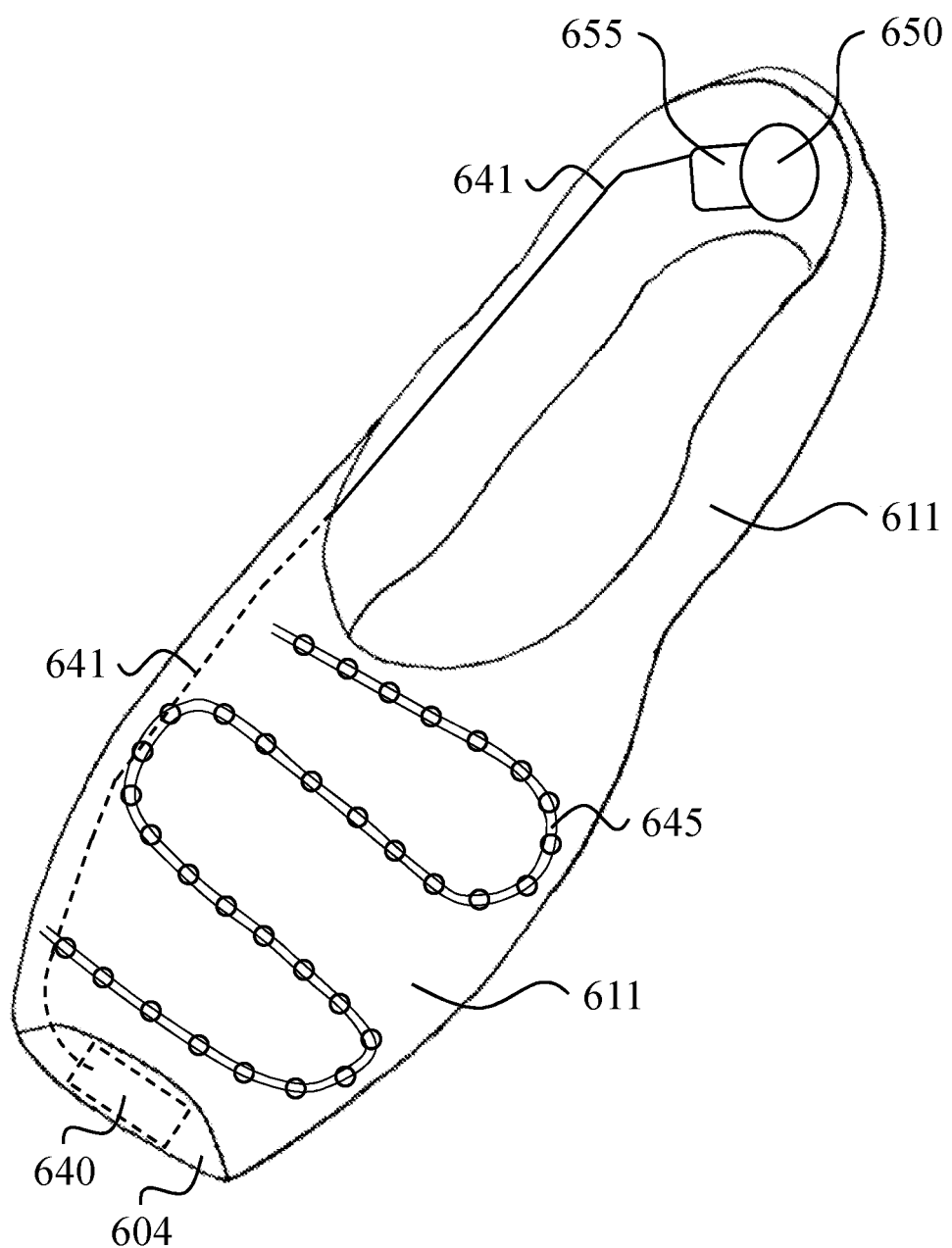
FIG. 6 shows a diagram of another example of a kit for enhancing a pointe shoe.

FIG. 6 shows a diagram of another example of a kit for enhancing a pointe shoe. This kit includes some features and/or components that are similar to those shown in FIGS. 1, 2, 3 and 4, and described above. At least some of these features and/or components may not be separately described in this section.

Keeping with the "do it yourself" approach, the kit shown in FIG. 6 is an example of a kit to enhance a pointe shoe that may be attached to the shoe in a simpler procedure. The kit includes a pointe shoe cover that is comprises a body (611), a toe portion (604) and a sole on the lower surface of the body (not shown in FIG. 6), and which has features and enhancements (described in previous examples) embedded into it. The body of the pointe shoe cover is configured to envelop, or wrap around, the pointe shoe such that the toe portion aligns with the platform of the pointe shoe.

In some embodiments, an LED ribbon (645) is embedded into the vamp of the body of the pointe shoe cover. The LED ribbon is connected to the button cell power source (650) and control circuitry (655) using a wire (641) that is affixed to the internal surface of the pointe shoe cover. In an example, a switch membrane (640) may be attached to an internal surface of the toe portion (604) of the pointe shoe cover.

In some embodiments, the body (611) of the pointe shoe cover may be made of lycra spandex, nylon spandex, cotton, wool, nylon, polyester, acrylic, spandex, silk, cashmere, mohair, or olefins (such as polypropylene), any blend of the aforementioned materials, or the like. The material of the body of the pointe shoe must be form-fitting so as to be able to snugly wrap around the pointe shoe. In other embodiments, the pointe shoe cover may be made of one or more layers of heat shrink wrap film, which can be configured to fit around the pointe shoe, and then conform to its shape with the application of heat. Various tints and thicknesses of heat shrink wrap film may be used to ensure that the electrical and electronic components are not adversely affected during the enhancement of the pointe shoe.

In some embodiments, the pointe shoe cover may be configured for one-time use. For example, treating a pointe shoe cover made from a specific type of heat shrink wrap film may result in a snug, form-fitting outer layer that functions as desired, but may not be readily removable. In other embodiments, a different type of heat shrink wrap film may be used for the body of the pointe shoe cover, and may be removable even after the heat treatment. Similarly, the lycra and nylon spandex bodies may be configured for one-time use or to be removed and reused.

In some embodiments, the toe portion of the pointe shoe cover may be made of satin, stretch satin, dance rubber, suede leather, canvas, leather, suede, or the like. This advantageously enables the toe portion to support the switch membrane and remain flush with the platform of the pointe shoe. In other embodiments, the sole of the pointe shoe cover may be made of dance rubber, suede leather, canvas, leather, suede, or the like. In yet other embodiments, the pointe shoe cover may feature elastic straps and/or ribbons to ensure that a form-fitting snug fit is maintained when using the pointe shoe cover.

It is intended that the specification, together with the drawings, be considered exemplary only, where exemplary means an example. As used herein, the singular forms "a", "an" and "the" are intended to include the plural forms as well, unless the context clearly indicates otherwise. Additionally, the use of "or" is intended to include "and/or", unless the context clearly indicates otherwise.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

What is claimed is:

1. A pointe shoe for a dance performance by a performer, the pointe shoe comprising:
   a plurality of light-emitting diodes (LEDs) affixed to an external surface of the pointe shoe;
   a power source;
   a rigid enclosure within a front end of the pointe shoe that encases and supports toes of the performer, wherein a front end of the rigid enclosure is flattened to form a platform upon which the performer can balance when standing en pointe;
   a piece of rigid material that stiffens a sole of the pointe shoe to provide support for an arch of an en pointe foot of the performer;
   a pressure sensor, in the rigid enclosure or affixed to the platform, configured to activate when the performer stands en pointe during the dance performance, wherein the pressure sensor comprises a capacitive layer, and wherein standing en pointe comprises the performer standing on the tips of their toes;
   a toggle switch configured to switch between the plurality of LEDs remaining off and the plurality of LEDs being activated as a function of the pressure sensor; and
   at least one wire connecting the power source to the plurality of LEDs, the toggle switch, and the pressure sensor.

2. The pointe shoe of claim 1, wherein the plurality of LEDs comprises a plurality of LED ribbons, and wherein a first of the plurality of LED ribbons is affixed to a binding of the pointe shoe.

3. The pointe shoe of claim 2, wherein a second of the plurality of LED ribbons is affixed to a vamp of the pointe shoe.

4. The pointe shoe of claim 1, further comprising:
   a radio frequency (RF) transceiver module, wherein the RF transceiver module is operatively connected to the pressure sensor.

5. The pointe shoe of claim 4, wherein the RF transceiver module uses a low-rate and low-latency wireless communication protocol.

6. The pointe shoe of claim 1, wherein the plurality of LEDs comprises one or more of LED ribbons, flexible organic LED (OLED) displays and LED sequins.

7. A kit for enhancing a pointe shoe, the pointe shoe being suitable for a dance performance by a performer, the kit comprising:
   the pointe shoe comprising:
      a rigid enclosure within a front end of the pointe shoe that encases and supports toes of the performer, wherein a front end of the rigid enclosure is flattened to form a platform upon which the performer can balance when standing en pointe, and
      a piece of rigid material that stiffens a sole of the pointe shoe to provide support for an arch of an en pointe foot of the performer;
   a plurality of light-emitting diodes (LEDs);
   a power source;
   a pressure sensor;
   a toggle switch; and
   at least one wire,
   wherein the plurality of LEDs is configured to be affixed to an external surface of the pointe shoe,
   wherein the pressure sensor is configured to be inserted into the rigid enclosure or affixed to the platform, and to activate when the performer stands en pointe during the dance performance, wherein standing en pointe comprises the performer standing on the tips of their toes, and wherein the pressure sensor comprises a capacitive layer,
   wherein the toggle switch is configured to switch between the plurality of LEDs remaining off and the plurality of LEDs being activated as a function of the pressure sensor, and
   wherein the at least one wire is configured to connect the power source to the plurality of LEDs, the toggle switch, and the pressure sensor.

8. The kit of claim 7, wherein the plurality of LEDs comprises a plurality of LED ribbons, wherein a first of the plurality of LED ribbons is configured to be affixed to a binding of the pointe shoe, and wherein a second of the plurality of LED ribbons is configured to be affixed to a vamp of the pointe shoe.

9. The kit of claim 7, further comprising a radio frequency (RF) transceiver module, wherein the RF module is operatively connected to the pressure sensor, and wherein the RF module is configured to be activated when the pressure sensor is activated.

10. The kit of claim 9, wherein the RF transceiver module uses a low-rate and low-latency wireless communication protocol.

11. The kit of claim 7, further comprising an accelerometer, wherein the toggle switch is further configured to switch between the plurality of LEDs remaining off and the plurality of LEDs being activated as a function of the accelerometer.

12. A kit for a enhancing pointe shoe, the pointe shoe being suitable for a dance performance by a performer, the kit comprising:
   the pointe shoe comprising:
      a rigid enclosure within a front end of the pointe shoe that encases and supports toes of the performer, wherein a front end of the rigid enclosure is flattened to form a platform upon which the performer can balance when standing en pointe, and
      a piece of rigid material that stiffens a sole of the pointe shoe to provide support for an arch of an en pointe foot of the performer;
   a pointe shoe cover comprising a body, a toe portion and a sole;
   a plurality of light-emitting diodes (LEDs);
   a power source;
   a pressure sensor;
   a toggle switch; and
   at least one wire,
   wherein the body of the pointe shoe cover is configured to envelop the pointe shoe,
   wherein the toe portion is configured to align with a platform of the pointe shoe,
   wherein the plurality of LEDs is affixed to an external surface of the pointe shoe cover,
   wherein the pressure sensor is configured to be affixed to the toe portion of the pointe shoe cover, and to activate when the performer stands en pointe during the dance performance, wherein standing en pointe comprises the performer standing on the tips of their toes, and wherein the pressure sensor comprises a capacitive layer,
   wherein the toggle switch is configured to switch between the plurality of LEDs remaining off and the plurality of LEDs being activated as a function of the pressure sensor, and
   wherein the at least one wire is affixed to an internal surface of the pointe shoe cover and is configured to connect the power source to the plurality of LEDs, the toggle switch, and the pressure sensor.

13. The kit of claim 12, further comprising a radio frequency (RF) transceiver module affixed to the internal surface of the pointe shoe cover, wherein the RF module is operatively connected to the pressure sensor, and wherein the RF module is configured to be activated when the pressure sensor is activated.

14. The kit of claim 13, wherein the RF transceiver module uses a low-rate and low-latency wireless communication protocol.

15. The kit of claim 12, wherein a material of the body of the pointe shoe cover is selected from the group consisting of spandex, lycra spandex, nylon spandex, cotton, silk, nylon, acrylic, polyester, wool, cashmere, mohair and heat shrink wrap film.

16. The kit of claim 12, wherein a material of the toe portion of the pointe shoe cover is selected from the group consisting of stretch satin, satin, dance rubber, suede leather, leather, suede and canvas.

17. The kit of claim 12, wherein a material of the sole of the pointe shoe cover is selected from the group consisting of dance rubber, suede leather, leather, suede and canvas.

* * * * *